United States Patent [19]

Burgess et al.

[11] 3,757,511
[45] Sept. 11, 1973

[54] LIGHT EMITTING DIODE DISPLAY FOR ELECTRONIC TIMEPIECE

[75] Inventors: Ronald R. Burgess, Phoenix; Michael G. Coleman, Tempe; Lawrence A. Grenon, Phoenix, all of Ariz.

[73] Assignee: Motorola, Inc., Franklin Park, Ill.

[22] Filed: May 17, 1971

[21] Appl. No.: 143,837

[52] U.S. Cl. ................ 58/50 R, 58/127 R, 350/267
[51] Int. Cl. ......................... G04c 3/00, G04b 19/06
[58] Field of Search ............. 58/23 R, 23 A, 23 BA, 58/23 C, 50 R, 127; 350/267; 340/309.4

[56] References Cited
UNITED STATES PATENTS

| | | | |
|---|---|---|---|
| 3,672,155 | 6/1972 | Bergey et al. ........................ | 58/50 R |
| 3,630,015 | 12/1971 | Lehovec ............................. | 58/50 R |
| 3,509,715 | 5/1971 | DeKoster ........................... | 58/50 R |

*Primary Examiner*—Richard B. Wilkinson
*Assistant Examiner*—Edith C. Simmons Jackmon
*Attorney*—Mueller & Aichele

[57] ABSTRACT

There is disclosed a light emitting diode timepiee display in which the output of the light emitting diode display is controlled with respect to ambient lighting conditions so as to provide the maximum amount of contrast with a minimum amount of power consumption. The contrast between the light emitted by the light emitting diodes and the ambient light in the immediate vicinity of the timepiece is enhanced by the use of absorption type filters, truncated pyramid type apertures in the display cover plate and a control circuit which adjusts the intensity of the output of the light emitting diodes to the ambient light conditions. There is further provided a series of solar cells on the face of the display, which recharge the timepiece batteries during ultra-high ambient light conditions and which supply additional power to the light emitting diodes during high ambient lighting conditions so as to increase the output of the light emitting diodes. This enhances the contrast of the diodes during high ambient lighting conditions while at the same time providing an additional source of power in parallel with that of the timepiece battery so as to increase the effective lifetime of the battery. Power distribution between the solar cells and the battery is controlled by the aforementioned control circuit. In addition, the control circuit varies the power available to the light emitting diodes such that in low ambient lighting conditions a lesser amount of power is delivered to the light emitting diodes while in high ambient lighting conditions, a larger amount of power is delivered to the diodes. In this manner the aforementioned contrast is kept constant and at that level which corresponds to the minimum level necessary for ready visibility. In addition, several structural embodiments are shown, all of which contribute to the enhancement of the light output of the light emitting diodes, the enhancement of display contrast, low power consumption, ease of fabrication, and mechanical stability of the final product.

27 Claims, 27 Drawing Figures

PATENTED SEP 11 1973 3,757,511

INVENTOR
Ronald R. Burgess
BY Michael G. Coleman
Lawrence A. Grenon

Mueller & Aichele
ATTY'S.

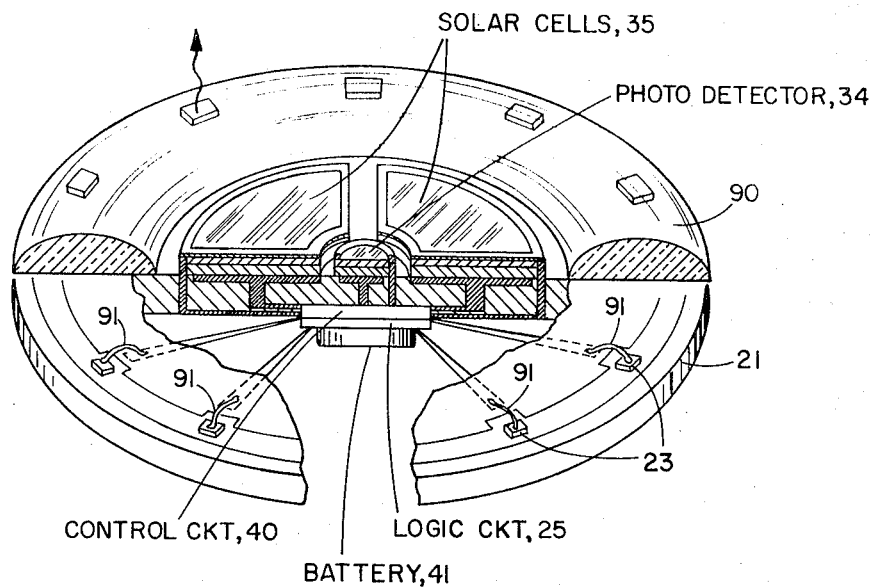
Fig. 10
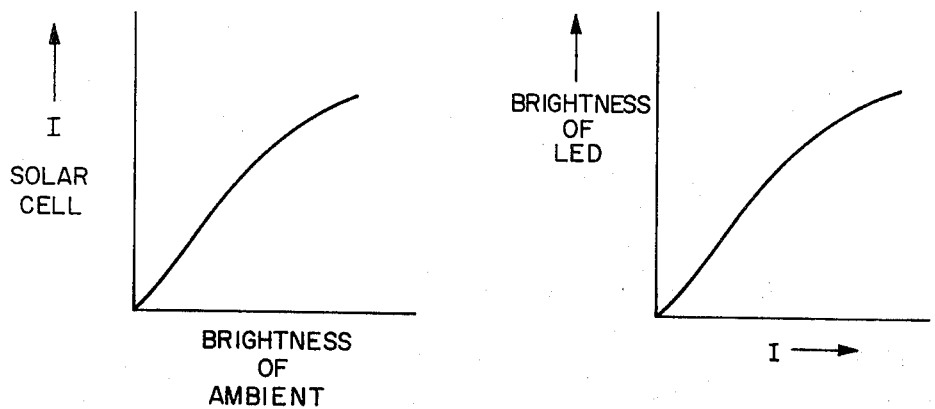
Fig. 11
Fig. 12

LIGHT EMITTING DIODE DISPLAY FOR ELECTRONIC TIMEPIECE

BACKGROUND OF THE INVENTION

This invention relates to electro-optical displays for electronic timepieces and more particularly to horologic displays using light emitting diodes in configurations which conserve power and thus extend battery lifetime for batteries utilized in providing power for the electronic timepiece.

While battery powered electronic watches utilizing classical electric motors in conjunction with mechanical drive mechanisms are commonplace, these watches suffer from dust and other particulate matter which invades the mechanical actuating mechanism and the mechanical display portions of the watch. The obvious problems with an electro-mechanical watch have been recognized for some time with respect to the amount of servicing necessary and the wear on the moving parts. Additionally, watches utilizing "hands" even when coated with luminous radioactive material are not easily read in low light ambient conditions.

Although all-electronic watches utilizing light emitting diodes have been made, they are in general unsatisfactory due to the power consumption of the light emitting diodes. This high power consumption prevents continuous readout of the timepiece because continuous readout runs battery powered watches down in a matter of weeks. Thus, electronic watches utilizing light emitting diodes have displays which are activated only a certain number of times per day in an effort to extend the lifetime of the battery used therewith. This is not only inconvenient but annoying to the user. The subject invention permits the use of a light emitting diode display on a wrist watch in which all power saving parameters are maximized so that the watch may be read out continuously for a reasonable period of time (a year or more) without replacing the watch battery. The battery drain during the continuous readout is kept to a minimum by the use of several light enhancement techniques, power supplementing techniques, and light emission control circuitry.

Specifically, in one embodiment in the cover plate over each of the light emitting diodes utilized is a truncated pyramid type aperture positioned over the light emitting diode therebeneath having sidewalls which are inclined. Secondly, overtop of each light emitting diode is a narrow band-pass filter which either absorbs white light and transmits only the light emitted from the diode or which is a circularly polarized filter which attenuates light passing twice through it. This enhances the "contrast" of the display which refers to the difference in intensity of the light at the surface of the diode as compared with the surface brightness of that portion of the watch face around the diode. By enhancing the contrast, power consumption for acceptable visibility can be significantly lowered. The apertured watch cover plate in the preferred embodiment is made from silicon having a [100] crystallographic orientation which permits easy aperture formation. This particular crystallographic orientation provides for the aforementioned truncated pyramid type apertures when silicon of this crystallographic orientation is etched through a square mask with a potassium hydroxide etching solution.

At this point it should be pointed out that a cover for any type light emitting diode display can be made having apertures with inclined sidewalls by utilizing a crystalline material which is etched preferentially in a given direction by a particular etchant. The light enhancement function of the inclined sidewalls with respect to light emitted by light emitting diodes is described hereinafter.

The contrast enhancement afforded by the aforementioned apertures and the narrow band-pass filter has utility both when power consumption is a problem and when an unlimited power supply is available for the "all-electronic" watch or clock. Thus, the light emitting diode display described herein may be utilized in automobiles, aircraft, and in non-mobile applications for contrast enhancement purposes where power consumption is not a problem.

In addition to contrast enhancement, the subject technique provides for contrast compensation to minimize power consumption. Where power consumption is a problem, as in battery operated wrist watches, the subject device includes an ambient light sensor and a control circuit which adjusts the output of the light emitting diodes such that in high ambient light conditions the light emitting diodes have a high output, while in low ambient lighting conditions the output of the light emitting diodes is limited by reducing the power thereto. It will be appreciated that in low ambient light conditions, such as at night, the requisite amount of contrast can be obtained with lower outputs from the light emitting diodes. Concomitantly in high ambient lighting conditions, the output of the diodes must be increased so as to provide for the aforementioned contrast. Thus the contrast is kept substantially constant and in so doing power consumption by the light emitting diode display is minimized.

In addition to the ambient light sensing and power control, the subject display is provided with a secondary power source in the form of solar cells. These solar cells provide two functions in high ambient light conditions. The first function is to recharge the battery for the display. Additionally and simultaneously the solar cells increase the power available to the light emitting diodes during high ambient light conditions so as to increase the output of the light emitting diodes therefore providing an acceptable contrast between the light emitted by the diodes and the ambient light reflected at the surface of the display. The secondary power source is not limited to the preferred solar cells and may in fact be a secondary battery which is switched into the circuit during high ambient lighting conditions so as to provide the additional power to the light emitting diodes. The power distribution from the secondary power source and the primary power source are controlled by the aforementioned control circuit.

There are also disclosed several fabrication techniques for making the completed display. The first of these techniques is a monolithic fabriction technique which results in reliability, shock resistance and physical thinness of a completed timepiece. A somewhat less expensive fabrication technique involves a hybrid layered structure with semiconductor support members and display covers. A third fabrication technique involves the use of a conventional printed circuit board, discrete devices and either a toroidal plastic cover or a silicon face plate with the aforementioned apertures therethrough. In addition, the aforementioned silicon cover plates provides a substrate into which can be grown or diffused the aforementioned solar cells and the ambient light sensing device, thus providing for a mechanically stable structure.

While the following discussion will be limited to electronic timepiece displays, the invention described herein applies to an electro-optical display utilizing light emitting diodes in which contrast is to be maximized and power consumption minimized.

SUMMARY OF THE INVENTION

It is therefore an object of this invention to provide an improved electronic timepiece in which the display for the timepiece includes light emitting diodes in a high contrast configuration.

It is another object of this invention to provide an improved electronic timepiece utilizing a light emitting diode display in which the power consumption of the light emitting diodes is minimized.

It is a still further object of the invention to provide an improved electronic timepiece utilizing a light emitting diode display in which watch face contrast is enhanced by the use of narrow band-pass filter material.

It is a still further object of this invention to provide an improved electric timepiece utilizing a light emitting diode display in which display contrast is enhanced by the use of a cover plate on top of the light emitting diodes having an inclined sidewall type aperture at each diode and through which the emission of each diode passes.

It is a still further object of this invention to provide an improved electric timepiece utilizing a light emitting diode display in which power consumption of the display is minimized by sensing ambient lighting conditions and adjusting the output of the light emitting diodes so as to obtain the minimum amount diode output for an acceptable contrast.

It is a still further object of this invention to provide an improved electronic timepiece utilizing a light emitting diode display in which the ambient lighting condition is sensed and in which the primary power supply is augmented by a secondary power supply during high ambient lighting cnditions so as to increase the output of the light emitting diodes during the occurrence of a high ambient lighting condition.

It is yet another object of this invention to provide an improved electronic timepiece having a light emitting diode display in which the timepiece is supplied with a secondary power source including a number of serially connected solar cells whose output is connected in parallel with the primary source whenever the ambient lighting condition for the timepiece is high, the solar cells providing a recharging function for the primary power source as well as a power enhancing function for the light emitting diodes during high ambient lighting conditions.

It is yet another object of this invention to provide an improved electronic timepiece utilizing a light emitting diode display in which both the display and logic portions of the timepiece are fabricated in monolithic form.

It is a still further object of this invention to provide an improved electronic timepiece having a light emitting diode display in which the display portion of the timepiece is fabricated in a layered configuration with one of the layers being a substrate for the light emitting diodes and the second layer serving as a cover for the display, as a narrow band-pass filter, and as a support for solar cells and an ambient light sensor.

It is yet a still further object of this invention to provide a cover for an electro-optical display in which the apertures in the cover have inclined sidewalls formed by etching a crystalline material in a preferential direction.

Other objects of this invention will be better understood upon reading the following description in connection with the accompanying drawings.

BRIEF DESCRIPTION OF THE DRAWINGS

FIG. 10 is a diagram in partial cross section of a light emitting diode display including solar cells and a photodetector mounted on top of a substrate, showing a toroidal cover for the diodes. There is also shown the embedding of the control circuit and logic circuit in the substrate with a battery immediately adjacent the logic circuit.

FIG. 11 is a graph showing current output of solar cells as a function of the brightness of the ambient light.

FIG. 12 is a graph relating the current driving light emitting diode to the brightness of the output of the diode.

BRIEF DESCRIPTION OF THE INVENTION

Figure 1:
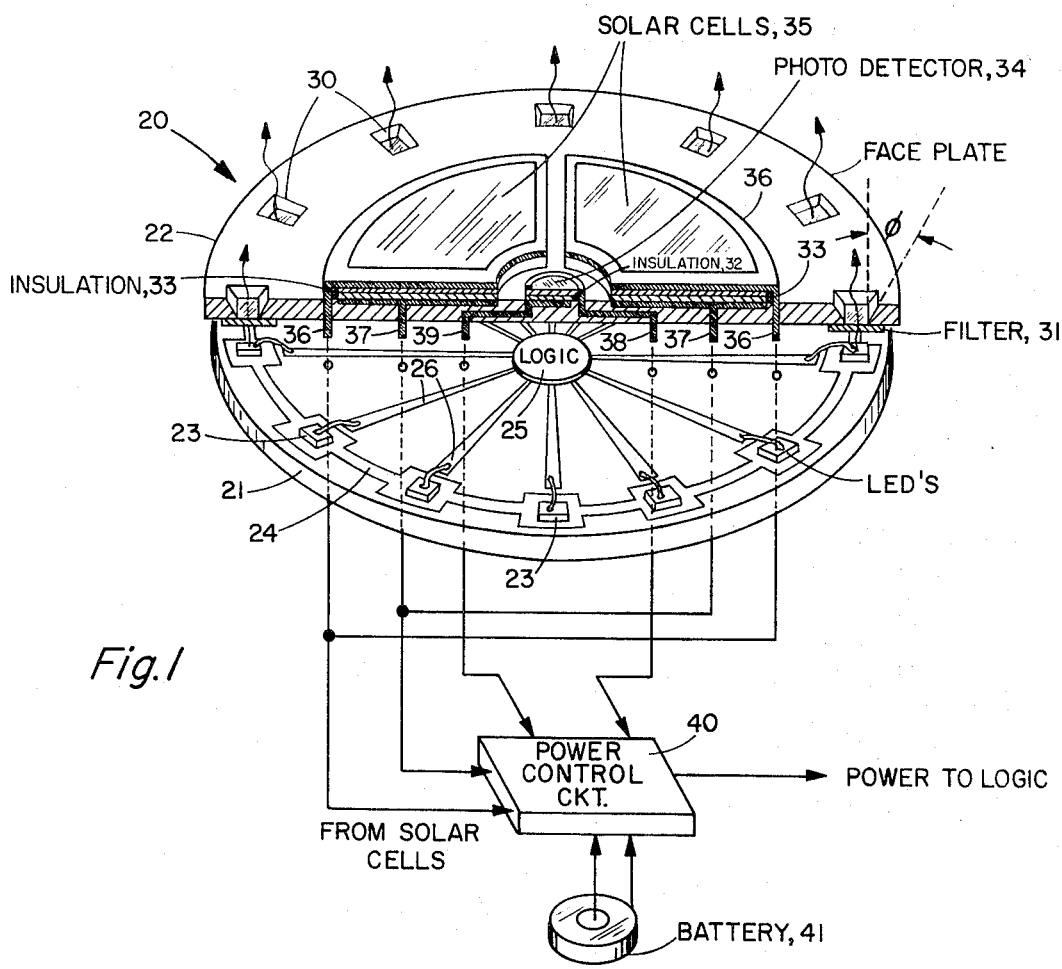
FIG. 1 is a partial cutaway drawing of the light emitting diode display including the placement of solar cells and a photodetector on top of the face plate with interconnections through the face plate and through the support of the light emitting diodes to a power control circuit whose function is to both alter the power to the light emitting diodes and to distribute the power from the timepiece battery and the solar cells so as to take maximum advantage of the light energy impinging on the face plate of the timepiece.

There is disclosed a light emitting diode electronic timepiece display in which the outputs of the light emitting diodes are controlled with respect to ambient lighting conditions so as to provide the maximum amount of contrast with a minimum amount of power consumption. The contrast between the light emitted by the light emitting diodes and the ambient light in the immediate vicinity of the display is enhanced by the use of narrow band-pass filters, inclined sidewall type apertures in the display cover and a control circuit which adjusts the intensity of the output of the light emitting diodes to the ambient lighting conditions so as to maintain a constant contrast between the display and ambient light reflected from the surface of the display. There is further provided, in one embodiment, a series of solar cells on the face of the display, which recharge the timepiece batteries during ultra-high ambient light conditions and which supply additional power to the light emitting diodes during high ambient light conditions so as to increase the output of the light emitting diodes. This enhances the contrast of the diodes during high ambient light conditions while at the same time providing an additional source of power in parallel with that of the timepiece battery so as to increase the effective lifetime of the battery. Power distribution between the solar cells and the battery is controlled by the aforementioned control circuit. In addition, the control circuit adjusts the power available to the light emitting diodes such that in low ambient lighting conditions a lesser amount of power is delivered to the light emitting diodes while in high ambient lighting conditions, a larger amount of power is delivered to the diodes such that the aforementioned contrast is kept constant and at the level which corresponds to the minimum level necessary for acceptable visibility of the display. In addition, several structural embodiments are shown, all of which contributing in some measure to the enhancement of the light output of the light emitting diodes, the enhancement of display contrast, low power consumption, ease of fabrication, and mechanical stability of the final product.

DETAILED DESCRIPTION OF THE INVENTION

One of the major problems with an "all-electronic" watch involving light emitting diodes in a display configuration is the power consumption of the circuit. There are many alpha-numeric displays utilizing a multiplicity of light emitting diodes which can indicate in alpha-numeric form the time of day. The trouble with these horologic displays is the number of light emitting diodes necessary to convey the time of day. Concomitant with these numbers of diodes is the power consumption which makes continuous readout of these devices impractical when the timepieces are to be powered by portable self-contained batteries. There is, however, another way of displaying time, described in detail in connection with FIGS. 16 and 17, involving the use of a plurality of concentric circles. If two concentric circles are used to represent the time of day having 12 and 60 individual light emitting diodes respectively, the time is read out from this display by simultaneously reading out one diode from the ring of 12 indicating the hour; and two diodes from the ring of 60 representing numbers and seconds respectively. Alternatively, an additional 12 diodes 12 diodes can be used in the ring already containing 12 diodes to represent half hour intervals. These additional diodes are useful in resolving ambiguities resulting from readouts near the hour change. Thus, at any one time no more than four diodes are lit as compared with as many as 87 diodes in an unstrobed alpha-numeric matrixed display. The logic necessary to power or drive the subject display is described in connection with FIG. 18 and consists of a frequency standard, various electronic count-down circuits, decoding circuits and driving circuits.

One prior art example of display utilizing light emitting elements to indicate the time of day is shown in the U.S. Pat. to R. D. Anderson, No. 3,455,152 issued July 15, 1969. Both the electronic clock shown in the Anderson patent and the variety of alpha-numeric electronic clocks and wrist watches, known to the prior art, suffer from the aforementioned power consumption to such degree that they cannot be utilized in wrist watch form with batteries conventionally available for any length of time in a continuous readout mode.

Th electronic timepiece to be described herein is capable of being read out continuously for a year without changing the primary battery in the system. While logic circuits have been devised which utilize on the order of 5 microamps of current in the mode in which the subject display is driven, the subject display draws only an additional 10 microamps in addition to the 5 microamps of the logic circuit. This permits the operation of the subject timepiece on a 3 volt battery for at least one year when either 72 or 84 diode elements are utilized in the configuration in which either 3 or 4 elements are lit at one time. In this manner a continuous readout is obtainable over a period of longer than one year.

There are two mechanisms which decrease the power consumption of the display. The first utilizes the concept that for a given ambient lighting condition there is a minimum readable output from the light emitting diodes. In low ambient lighting conditions the output of the diodes need be considerably less than in high ambient lighting conditions. In the subject display there is provided an ambient light sensing device in combination with a power control circuit which adjusts the power to the light emitting diodes of the display so as to minimize the power consumption the th diodes. Secondly, advantage is taken of the energy contained in the light impinging on th surface of the timepiece. To this end the timepiece is provided with a series of solar cells which function either to increase the power to the light emitting diodes during high ambient lighting conditions or to recharge the primary battery for the timepiece. The power consumption of these diodes is further reduced by the use of narrow band-pass filter over the light emitting diodes. In addition the timepiece cover has apertures having inclined sidewalls therethrough, which in one configuration are in the form of truncated pyramids. These two structural components increase the contrast between the diodes and the surfaces surrounding them so as to permit a decrease in the output from the diodes necessary to maintain a given contrast.

Figure 18:
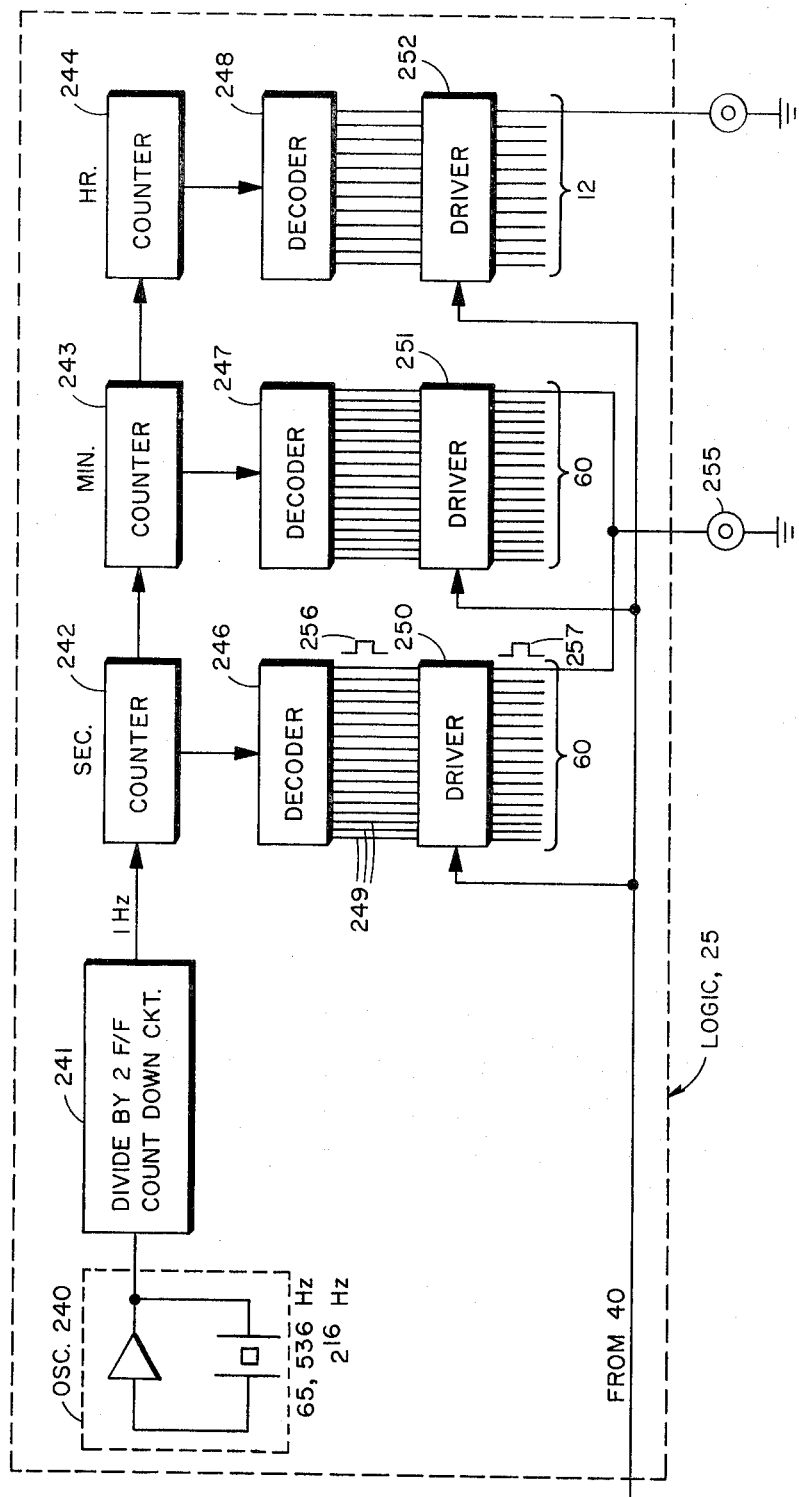
FIG. 18 is a block diagram showing one possible logic circuit to drive the display.

Referring now to FIG. 1, a light emitting diode timepiece display 20 is shown being comprised of a substrate 21 and a cover plate 22. At the periphery of the substrate 21 are mounted a plurality of light emitting diodes 23 on top of metallization 24 which is configured in a manner compatible with the timepiece logic 25 shown centrally located and mounted on the substrate 21. A simplified logic is shown in FIG. 18 to be described hereinafter. The metallization 24 provides contact to one electrode of the light emitting diodes 23. Further metallizaiton strips 26 connect various of the opposite electrodes of the light emitting diodes 23 to the logic 25. As can be seen from this figure, a cover plate 22 is provided with a multiplicity of apertures 30 which are positioned over respective diodes 23. Within or behind these apertures are provided the aforementioned filters 31. Mounted on top of the cover plate 22 are solar cells 35 which are provided with contact metallization layers and structures 36 and 37 which protrude through the cover and the substrate so as to connect the solar cells to the power control circuit shown at 40. Member 36 is isolated from the solar cell by isolation 33. Also mounted on top of the cover 22 is an ambient light sensor, designated photodetector 34 having contacts thereto labelled 38 and 39. These contacts also protrude through the substrate 21 to connect the photodetector to the power control circuit 40. Battery 41 which is the primary source of energy for the timepiece 20 is also connected to the power control circuit 40.

The light emitting diodes 23 are of a conventional configuration and, depending on the color of the output desired, can be fabricated from gallium arsenide phosphide, gallium phosphide, gallium arsenide coated with phosphors, gallium aluminum arsenide, and indium gallium phosphide. Indeed, any light emitting diode material may be utilized if the light emitted is in the visible range. Gallium arsenide with phosphors function such that the phosphor "up converts" the infrared radiation generated to visible light.

The substrate 21 on which the light emitting diodes 23 are mounted can be of any insulating material. In particular, it may be of a printed circuit board configuration with the metallization being copper, the copper being plated with gold to prevent corrosion. The substrate 21 can also be made of a ceramic material or indeed of a semiconductor material with isolated light emitting diodes grown or embedded therein. This configuration is shown in connection with FIGS. 13a-13i to be discussed hereinafter. It will be appreciated that if the substrate 21 is of a semiconductive material, the only requirement is that the diodes be electrically isolated, one from another. This can be done either by dielectric isolation or junction isolation such that the substrate 21 does not have to be an insulator. Obviously, the diodes 23 and the metallization 24 and 26 can be made to adhere to almost any type of substrate.

Although the diodes 23 are shown mounted on a continuous back contact metallization layer 24, the back contact to the diodes may be made in any convenient manner compatible with the logic 25. This may involve the use of segmented families as shown in the aforementioned Anderson patent. In general, the metallization over the substrate 21 is either standard silver or gold metallization such as would adhere to ceramics, is standard copper on conventional circuit boards which is latter plated with gold, or is titanium-molybdenum-gold, titanium-nickel-gold, or titanium-nichrome-aluminum.

The cover plate 22 can be in general to be an opaque ceramic, plastic or glass having a pleasing appearance. The cover plate can also be metallic if appropriate isulation is provided for the solar cells, the photodetector and the leads therefrom. Additionally, the cover plate 22 can be made from a semiconductor material which is etched in a preferential direction such as silicon. If a silicon cover plate 22 having a [100] crystallographic orientation is utilized, the apertures 30 having inclined sidewalls can be easily fabricated. These apertures take on a truncated pyramid type form, as shown in FIG. 1, by providing an etch mask over the cover plate 22 having square apertures therethrough. When hot potassium hydroxide is utilized to etch through this particular type of silicon, the truncated apertures, whose utility will be described hereinafter, are readily formed.

The inclined sidewall structure is useful in display covers other than those utilized with watches. In fact, there is a light enhancement characteristic associated with inclined sidewalls for any electro-optical display. These sidewall inclinations are easily formed in crystalline material, which due to its crystallographic orientation is etched in a preferential direction. This is called anisotropic etching. Thus for [100] silicon, the crystal is etched by potassium hydroxide only along one plane. This preferential etching gives a sidewall inclination with the vertical at an angle $\phi$ of 54°. Other crystals in other crystallographic orientations also are preferentially etchable. Thus inclined sidewall apertures can be formed by photolithographic techniques over an entire array of light emitting diodes without grinding or cutting operations. The light enhancement characteristics of these inclined sidewall apertures with respect to light emitting diodes will be discussed in connection with FIGS. 6, 7 and 8.

The solar cells 35 are typically fabricated from gallium arsenide, silicon and germanium. However, high output solar cells are available in most semiconductor materials. The output of these solar cells is in general less than the maximum theoretical output and is roughly equal to the band gap of the solar cell material. At present, the optimum output voltage for a silicon solar cell is approximately 0.6 volts at the power drains involved. If the timepiece is to be designed with a 3.0 volt primary battery or even a 1.5 volt primary battery, a number of solar cells connected in series are preferred. The number of solar cells to be connected in series is dictated by the total voltage output desired. In general and in the configuration shown, it is desirable to have a total output voltage from the solar cells in excess of that of the primary battery so that the solar cells can be connected in parallel with the primary battery either to recharge it or to provide additional power to the light emitting diodes. Provisions must be made in the control circuit 40 to prevent the solar cells from loading the battery and therefore causing additional drain thereon. If the output of the solar cells is less than that of the primary battery, a DC to DC converter operating at very high efficiency is necessary to transfer the power from the solar cells to the battery.

With respect to the photodetector 34, the most common photodetector is made of cadmium sulfide. This detector can, however, be any type of phototransistor, photodiode or photoresistor whose characteristics vary with the amount of light impinging thereon. There is no attempt made at this point to match the characteristics of the photodetector with those of the solar cells 35 although there will be obviously a correlation between the output of the solar cells 35 and the internal characteristics of the photodetector 34 with respect to the ambient lighting condition described hereinbefore.

Figure 2:
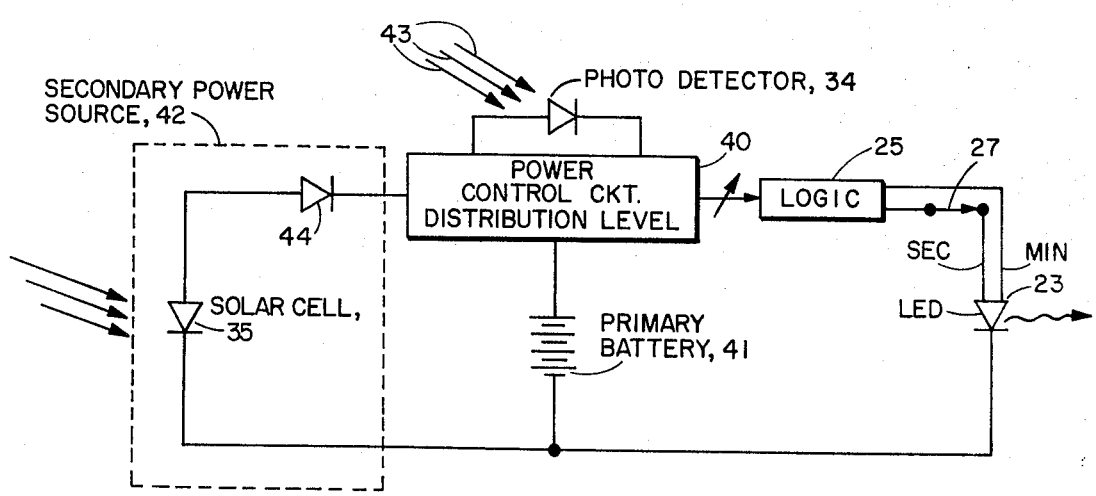
FIG. 2 is a block diagram showing primary and secondary power sources coupled to a power control circuit to which is also coupled an ambient light sensor, the output of the power control circuit being coupled to a logic circuit which then drives the light emitting diode display.

As shown in FIG. 2, the power control circuit 40 in conjunction with the photodetector 34, the primary battery 41 and the secondary power source shown diagrammatically at 42, serves at least three functions.

In connection with the photodetector 34, it is one function of the power control circuit 40 to vary the amount of power delivered to the logic circuit 25 and thus to the light emitting diodes represented here by a single diode 23. The power driving the light emitting diode 23 is controlled by controlling the current to the light emitting diode. This is accomplished by sensing the ambient lighting condition shown by the arrows 43 such that the current delivered is a direction function of the intensity of the light detected at the photodetector 34. Thus the higher the ambient lighting condition the more power delivered to the light emitting diode. The amount of current reduction dictated by a low ambient lighting condition, such as occurs at night, is related to the aforementioned contrast desired. In general, the contrast is the difference between the surface brightness of the light emitting diode as compared to the surface brightness of the area immediately surrounding the diode in the display. After having ascertained a certain desirable but minimum contrast, the power control circuit 40 maintains this contrast during all lighting conditions. The effect of the maintenance of this contrast is to reduce the power to the light emitting diodes during low ambient lighting conditions thus conserving power.

The second function of the power control circuit is to regulate the distribution of the power from the primary battery 41 and the secondary power source 42 which in this case is the solar cell 35. This distribution regulation may take three alternate forms. The first is merely a switching function. When the ambient light, as detected by the photodetector 34, exceeds a predetermined threshold, power from the solar cell 35 is switched directly to the logic circuit 25 and thus to the light emitting diode 23, while at the same time eliminating the primary battery 41 from the circuit. This conserves the primary battery power by substituting the power generated by the solar cell 35. Secondaly, with the use of a blocking diode 44 and the combined solar cell output 35 being greater during high ambient lighting conditions than that of the primary battery 41, the output of the solar cell may be connected in parallel across the primary battery. This serves in and of itself two functions. The first is to recharge the battery during high ambient light conditions and the second is to provide additional power to the light emitting diode during these high ambient lighting conditions. The blocking diode 44 prevents the solar cell 34 from draining or providing a load for the battery 41 during low ambient lighting conditions.

Thirdly, more sophisticated power control circuits can be devised for the power control circuits 40 such that a given amount of power from the solar cell 35 diverted for use in powering the light emitting diode while another portion of this power is diverted to charge the primary battery 41.

Thus the functions of the power control circuit 40 are threefold: the first being to control the amount of power to the light emitting diode; the second being the supplementing of the power derivable from the primary battery by a secondary power source; and the third being the recharging of the primary battery when the secondary power source is in the form of a solar cell. It will be appreciated that control circuits to provide each of the aforementioned functions are known and may be obtained in integrated circuit form.

In the configuration shown in FIG. 1 only the outermost ring of diode elements is shown. As will be shown in connection with FIGS. 16 and 17, in the preferred embodiment there are two concentric rings of elements with the inner ring denoting the hour, and outer ring denoting the minutes and seconds. At any given time three diodes are lit thus conserving power over alphanumeric displays. However, if the outer ring of diodes were to run in continuous operation not only would there be more of a power drain but also there might be a hypnotic effect. If this display were to be used in a car there would of necessity be a need for some way of interrupting the signals to outer ring of diodes containing the information for the "seconds" display, during period when the determination of time to the second is unnecessary. The subject display is provided with means, shown by switch 27, to cause such a signal interruption. The system can be arranged such that by pushing a button on the timepiece either seconds can be read out until the button is released or seconds can be read out until the button is again pushed. However, the configurations of the invention shown herein do not depend on intermittent readout of seconds for their longevity. With the contrast enhancing structures and the power control circuitry described herein, assuming three or four diodes are read out at a time, the primary battery for the timepiece will last for more than one year.

Figure 3:
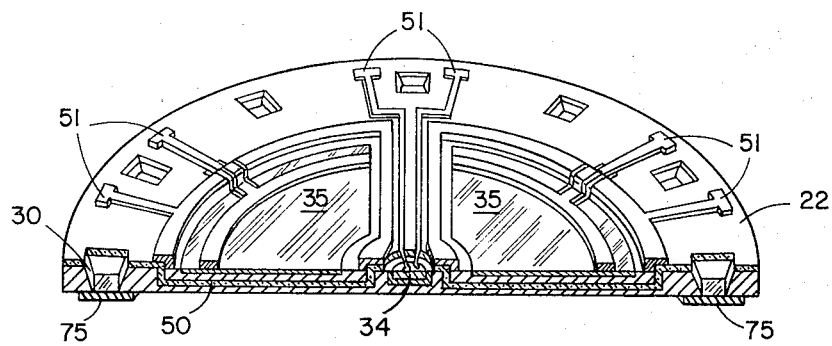
FIG. 3 is a cutaway diagram showing the solar cells and the ambient light sensing device diffused into a face plate made of a semiconductive material.

Referring to FIG. 3, the solar cells 35 and the photodetector 34 are shown in monolithic form embedded in the cover plate 22. In this case both the solar cells and the photodetector are isolated by dieletric isolation 50 since it will be appreciated that junction isolation is not sufficient, to permit proper operation of the solar cells and the detector. Also shown in FIG. 3 are a variety of contacts resting on top of the dielectric isolation layer 50. It is in this configuration that connections between the solar cells and the photodetector and the rest of the watch assembly can be most easily made. In this configuration a portion of the watch case (shown in connection with FIG. 13) overlaps the contact pads 51. This watch cover or case has corresponding metallization layers running on the inside of the watch case down around the edge of the cover plate 22 and terminating at the respective circuit elements, such as those shown in FIG. 2. Contact is made to the contact pads 51 by pressing engagement of the watch cover or by actually soldering the pads 51 to the corresponding pads within the interior of the aforementioned watch cover.

The cover plate 22 in this case is preferably the aforementioned silicon having the [100] crystallographic configuration. As mentioned hereinbefore, when this silicon substance is etched with potassium hydroxide, truncated pyramid type apertures 30 are formed due to the preferential etching of the silicon by the potassium hydroxide etching solution. The function of the tapered sidewalls of these apertures will become apparent from consideration of two different types of light emitting diodes.

Figure 4:
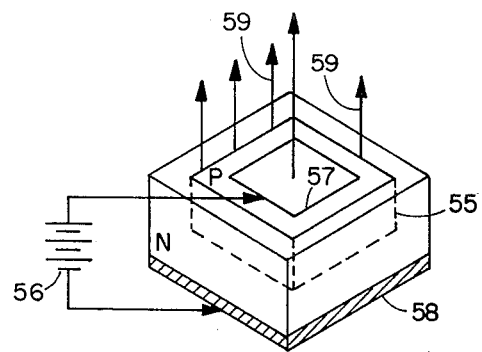
FIG. 4 is a diagram of a light emitting diode in which the light generated emanates from the top surface of the diode.

The first of these light emitting diodes is a planar diffused diode and is shown in FIG. 4. This type diode configuration is typical of gallium arsenide phosphide diodes. As can be seen, the diode is composed of an N and P type material with the junction shown by the dotted line 55. The emission from the planar diffused diode is in the vertical direction, as shown by the arrows 59, when a voltage as shown by the battery 56 is applied between the top contact 57 and the bottom contact 58. These arrows are perpendicular or within a small angle of the perpendicular to the top surface of the diode shown in FIG. 4. Looking at the top of the diode then, the only portion of the diode which appears to be generating light is the interior portion shown by the P type material. This type of diode has obvious advantages in that the majority of the light is propagated in a single direction.

Figure 5:
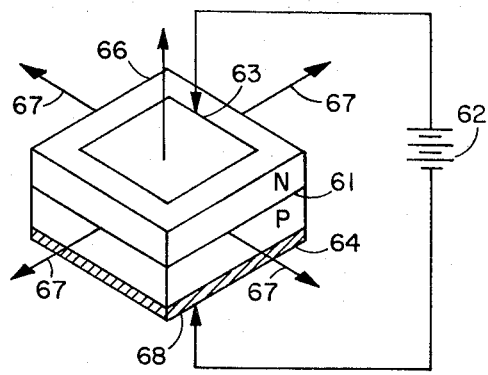
FIG. 5 is a diagram of a light emitting diode in which light emerges in both a horizontal and a vertical direction.

A messa type diode is shown in FIG. 5. In this case the diode material is red light emitting gallium phosphide having a N and P type region, as shown. Here the junction is shown by the line 61. When a potential is applied across the junction by a battery shown at 62 across the contacts 63 and 64, there is a nearly isotropic light emission in which light emanates not only from the top surface, as shown by the arrow 66, but also horizontally as shown by the arrows 67. It will be appreciated that a contact plate 68 reflects downwardly propagating light back through the diode in an upward direction.

Figure 6:
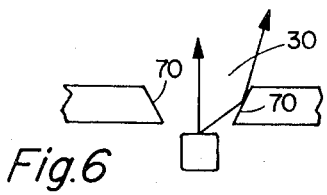
FIGS. 6, 7 and 8 show inclined wall and straight wall apertures through which the light from light emitting diodes passes, indicating the advantages of each configuration.
Figure 7:
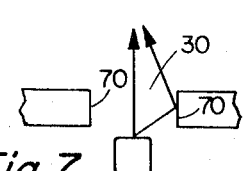
Figure 8:
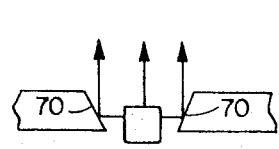

Referring now to FIGS. 6, 7 and 8, if the diode is of the planar diffused type, such as that shown in FIG. 4, and if the cover is provided with an inclined aperture shown in FIG. 6, then light emitted in a non-vertical direction will be reflected by the sidewalls 70 of the aperture 30 so as to redirect the light towards the user. The slope of the sidewalls both concentrates the light within a given viewing angle and permits the viewing of the light emitted by the light emitting diode from a position not directly above the diode. This gives the display a higher intensity over a wider viewing angle. If the sidewalls 70 are vertical there is still a portion of the radiation from the diode which is reflected back to the viewer, as can be seen in FIG. 7. It will be appreciated, however, that the viewing angle is narrowed significantly by the user of perpendicular sidewalls of the apertures 30. The slanted or inclined sidewalls 70 have, however, particular advantage in any electro-optical display when used in conjunction with diodes having either nearly isotropic emissions or in which significant portions of the light are radiated laterally. Because of the nearly isotropic light emission, a great deal of the light energy generated by the diode would be lost unless the diode is located within the aperture 30 as shown in FIG. 8. Here the sidewalls redirect the light emanating horizontally from the diode and reflect it vertically. This type configuration enables the use of the low power gallium phosphide light emitting diodes because the majority of the radiation emitted by the diode is redirected towards the viewer.

Referring back now for a moment to FIG. 3, another feature which contributes to the enhancement of the contrast of the subject display in addition to the particular aperture configuration just described, is the use of filter material 75 at the base of these apertures. In the normal fabrication of light emitting diodes, the top surfaces of the diodes are usually coated with a quarter-wave reflecting film so as to enhance the output of the diode. In addition to this type of quarter-wave filter, a narrow band-pass filter of a transparent material 75 having the same color as the output of the diode, is positioned between the diode and the observer so that the contrast between the passive portion of the display and the active portion of the display is increased. This contrast enhancement is accomplished because ambient light is absorbed by the filter while light emanating from the light emitting diode is transmitted by the narrow band-pass characteristic. Thus, the ambient light is in effect damped, while the light emitted from the light emitting diode is enhanced. This, by definition, increases the contrast between the surface brightness of the light emitting diode and the surface brightness of the area immediately surrounding the diode. Any type material which is transparent to the light emitted by the diode may be utilized. These materials include plastics and tinted glasses having the required transmission and absorption characteristics. The filter may be placed as shown or may be placed on top of the cover plate so long as it does not cover the solar cells and the photodetector.

Another type filter can be utilized other than the narrow band-pass filter thus described. This type filter is a circularly polarizing filter which circularly polarizes light passing therethrough. The effect of using circularly polarizing filter as the material 75 is as follows: Certainly the light emitted from the light emitting diode passes through the filter and has a circular polarization associated with it. Ambient light, however, impinging on the timepiece base passes through the aperture 30 and through the filter 75 thereby acquiring a circular polarization. The circularly polarized light then impinges on the top surface of either the diode or the passive portion of the display such that it is phase shifted. When this light is reflected back to the filter 75, it is attenuated in the filter because of this shift in polarization. Thus ambient light is absorbed in the polarizing filter while the light emanating from the diode is not significantly absorbed. This enhances the contrast between the light emanating from the diode and the light impinging on the display.

It will thus be appreciated that the inclined sidewall aperture structure, alone or in combination with the aforementined filter, increases the contrast as defined above such that the power necessary to maintain a given contrast is reduced. This in combination with the control circuit described in connection with FIGS. 1 and 2, provide a system for maximizing contrast in a timepiece light emitting diode display while at the same time minimizing power consumption.

Figure 9:
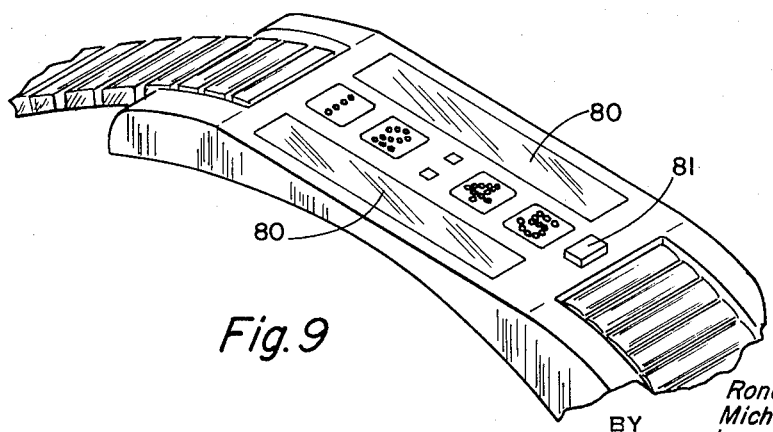
FIG. 9 indicates a light emitting diode timepiece display in which the readout is in alpha-numeric form.

As shown in FIG. 9, the timepiece displayed need not be of the concentric circular pattern shown in connection with FIGS. 1 and 3, but may, in fact, be an alphanumeric display surrounded by rectangular solar cells 80, having a photodetector 81 somewhere on the face of the display. Although more light emitting diodes are necessary in this type of display than in the display hereinbefore described, it is possible to minimize the power consumption of the display shown in FIG. 9 in exactly the same way as that shown in connection with FIGS. 1 and 3.

An alternate embodiment of the invention is shown in FIG. 10. In this embodiment, as in the former embodiments, a series of light emitting diodes 23 are mounted on a substrate 21. In this configuration, however, the cover plate is actually in toroidal form as shown by the reference character 90. This cover is formed in generally by injection molding of a plastic, which may either be an acrylic or a phenolic plastic having a color imparted thereto corresponding to the color emitted by the light emitting diodes therebeneath. The cover therefore serves both to protect the light emitting diodes and as the aforementioned narrow band-pass type filter. It will be obvious that this cover should not be superimposed either over the solar cells 35 or the photodetector 34 as it would absorb much of the energy conveyed by the light impinging on the timepiece surface. The solar cells and the photodetector are mounted in a similar fashion to that shown in FIG. 1 on top of the substrate 21. In this case, however, the metallization interconnects between the solar cells and the control circuit 40, the photoconductor and the control circuit 40, are as shown, through the substrate 21. In this particular configuration, the control circuit is attached directly to or embedded in the substrate 21 and the logic circuit 25 mounted directly thereon with the interconnections between the logic circuit and the control circuit being made at the control circuit-logic circuit interface. The position of the battery 41 is as shown so as to complete a compact package. The metallization which connects the logic circuit to the cathodes of the light emitting diodes is shown on the bottom surface of the substrate 21 with "feed-throughs" from the underneath surface of the substrate 21 to the top surface thereof and thence to the anodes of the individual light emitting diodes. Further, a hemi-toroidal filter can be used on top of the structures shown at FIGS. 1 and 3 for filters 31 and 75 respectively.

Referring to FIGS. 11 and 12, it can be seen that the output of the solar cells is a monotonic function of the brightness of the ambient and that the brightness of the output of the light emitting diodes is also a monotonic function of the current delivered thereto at a given voltage. These characteristics, as shown in FIGS. 11 and 12, enable the output of the solar cells to be applied in an increasing linear function to the light emitting diodes as the ambient light increases.

Figure 13A:
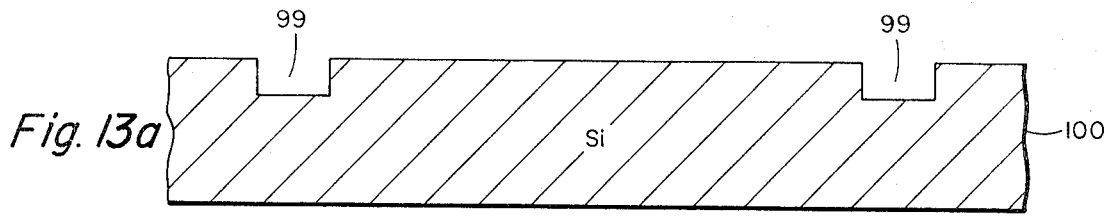
FIGS. 13a–13i show the fabrication of a monolithic timepiece light emitting diode display.
Figure 13B:
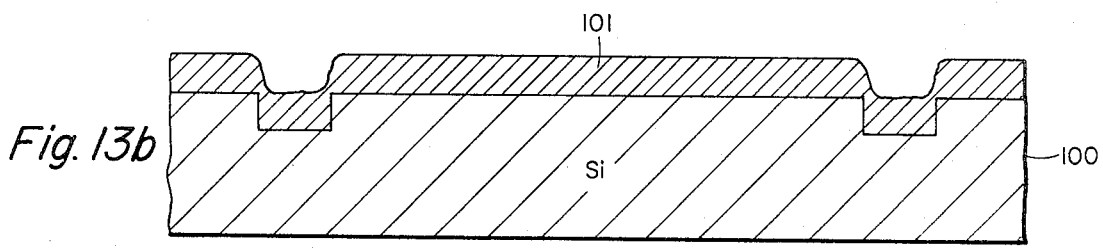
Figure 13C:
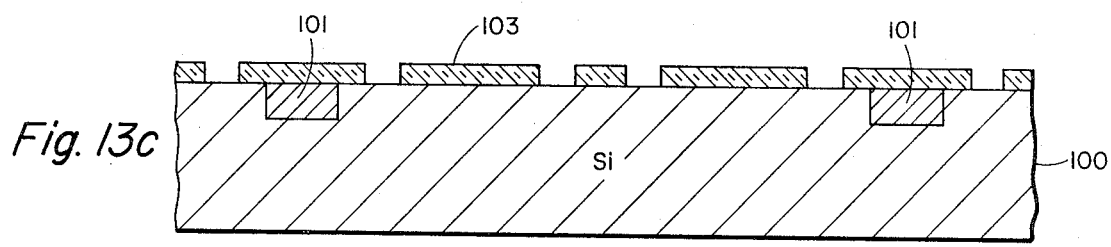
Figure 13D:
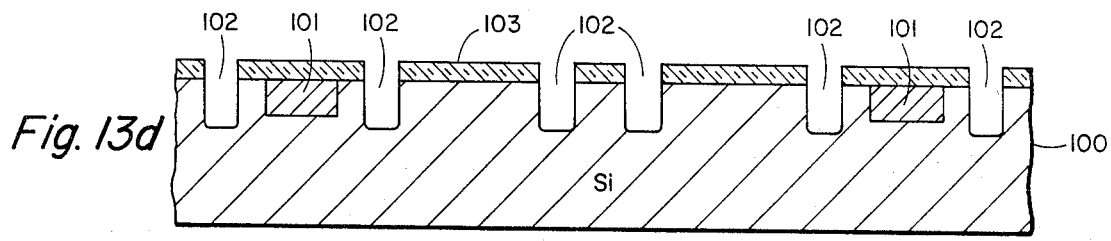
Figure 13E:
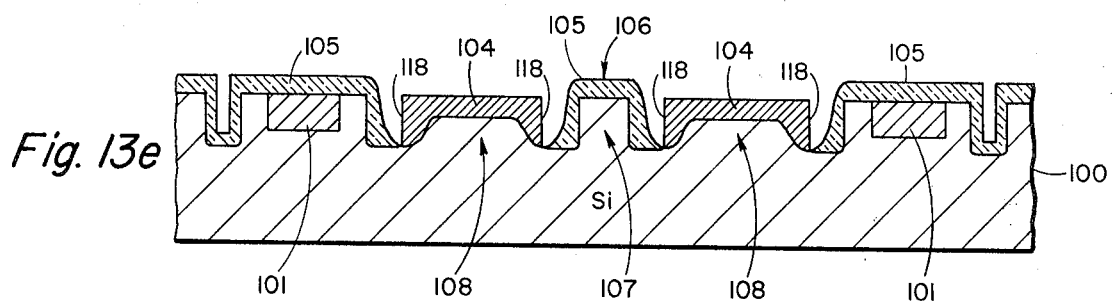

The subject display can be fabricated in monolithic form as shown in FIGS. 13a through 13i. In this configuration, a lightly doped silicon substrate 100 is etched so as to form the channels 99 as shown in FIG. 13a. An epitaxial layer 101 of gallium phosphide is deposited over the top surface of the silicon substrate 100 as shown in FIG. 13b. Thereafter, the structure shown in FIG. 13b is polished and the masking layer 103 consisting of dielectric material is deposited and patterned as shown in FIG. 13c. This mask covers the portions which are to become the solar cells, photodetectors, and light emitting diodes. Channels 102 are etched in substrate 100 through the apertures in layer 103 as shown in FIG. 13d. These channels are deeper than channels 99 shown in FIG. 13a to provide positive isolation as will be described hereinafter. A further masking layer 105 of a dielectric material is deposited and patterned as shown in FIG. 13e. It will be appreciated that the masking layer 103 is conveniently removed from the top of substrate 100 prior to the deposition of layer 105. The patterning of layer 125 as shown in FIG. 13e permits the formation of highly conductive areas 104 by diffusion of suitable dopants which are of the same conductivity type as that of the substrate 100. Alternately the central masking layer 105 can be removed so that the central area 106 (the photodetector area), can also be provided with the diffusion 104. Highly doped regions 104 are formed which eventually are necessary to improve the conductivity of the large area solar cells and/or the photodetector. These regions will eventually extend to the surface of the solar cells. This is made possible by providing that layer 105 not extend up the sidewalls 118 of channels 102. It will be appreciated that because of the light doping of the silicon, a lightly doped region 107 is formed centrally for the photodetector. The lightly doped silicon also forms one of the junction elements for the solar cells as shown at regions 108. Regions 100, 104 and 108 are of the same conductivity type.

Figure 13F:
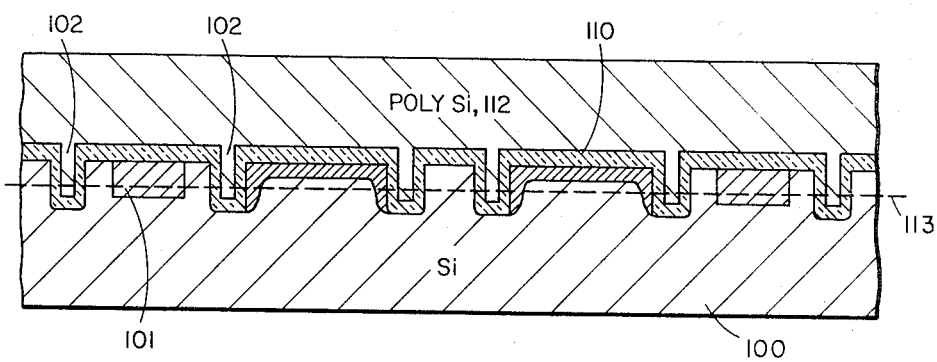

The top surface of the structure thus formed in FIG. 13e is then provided with a further dielectric layer continuously across the top surface. This is shown by the layer 110 in FIG. 13f. On top of this layer is formed a poly-silicon layer 112 which is on the order of 3 to 30 mils in thickness. As shown in FIG. 13f, the structure thus formed is then lapped and polished to the line shown at 113 thereby forming a series of dielectrically isolated islands containing portions of the semiconductor devices to be completed therein.

Since channels 102 were etched deeper than channels 99 the aforementioned positive isolation is obtained because while lapping the substrate 100 to the line 113, channels 102 are penetrated before the gallium phosphide region 101 is reached. The resulting structure is shown inverted at FIG. 13g.

Figure 13G:
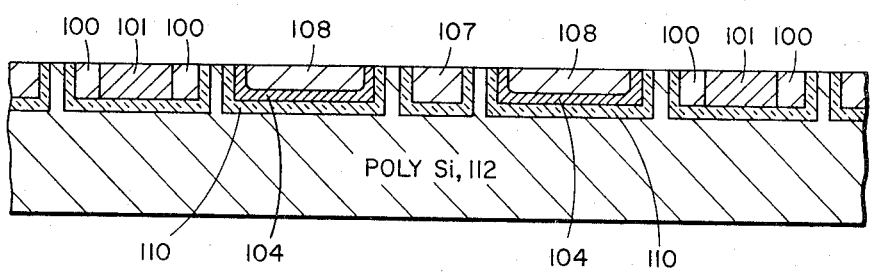
Figure 13H:
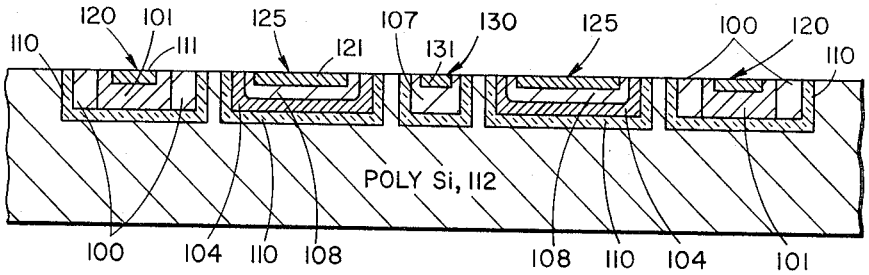

The light emitting diodes, solar cells and photodetector are than completed by diffusions through the top surface of the monolithic structures shown in FIG. 13g. When fabricating the LED's, solar cells, and photodetector it is necessary to deposit oxide and provide openings for the associated diffusions. This process requires several steps in that different doping materials and/or concentrations are required to fabricate the parts. The resulting elements are shown in FIG. 13h.

Figure 13I:
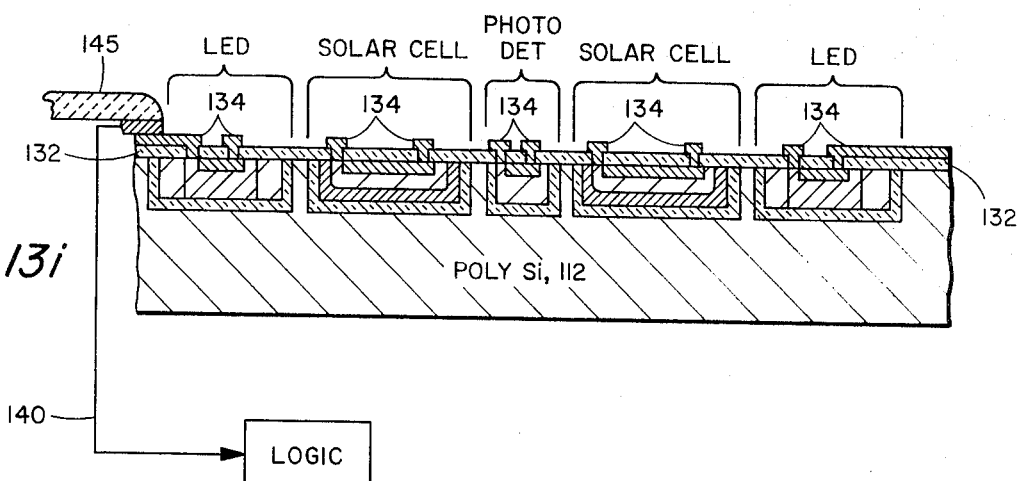

As shown in this figure, starting from the left, a light emitting diode 120 is formed in the poly-silicon layer 112. The gallium phosphide material 101 which forms the light emitting diode is isolated by the layer 110. This gallium phosphide layer is of a first conductivity type. Into the top surface thereafter is formed a region 111 of a conductivity type opposite to that of the material shown at 101. Next adjacent this diode is a solar cell 125 having a pot lined by the dielectric layer 110. At the bottom of the solar cell is a deep diffused layer 104 which extends to the surface of the monolithic device at the periphery of the solar cell. On top of the deep diffused layer is the lightly doped silicon region 108 of a like conductivity type to that of the deep diffused layer. A region of an opposite conductivity type 121 is diffused into region 108 to complete the solar cell 125. In this embodiment the central element, the photodiode 130 also is surrounded by a dielectric isolation layer 110 which is filled with the lightly doped silicon at region 107. Into the silicon region 107 is diffused a material 131 of a type opposite to that off the silicon region 107 so as to complete the photodiode 130. It will be appreciated that at this point the element 130 can be other than a photodiode, in that it can be a phototransistor of a photoresistor. Thereafter, as shown in FIG. 13i, a further dielectric layer 132 is deposited on the top surface and opened up over the active elements in the light emitting diodes, the solar cells and the photodetector. Patterned metallization layers 134 are then formed on the top surface thereof to complete the display. It will be appreciated that the particular patterning utilized in metallizing each of the individual elements is dependent on the particular appearance that the display is to take on. In this case, no attempt is made to contact the individual elements through the poly-silicon substrate 112. Rather the contacts are run to the edge of the substrate whereupon they are contacted by appropriate leads 140 disposed in a watch cover 145 which overlays these contacts.

Figure 14:
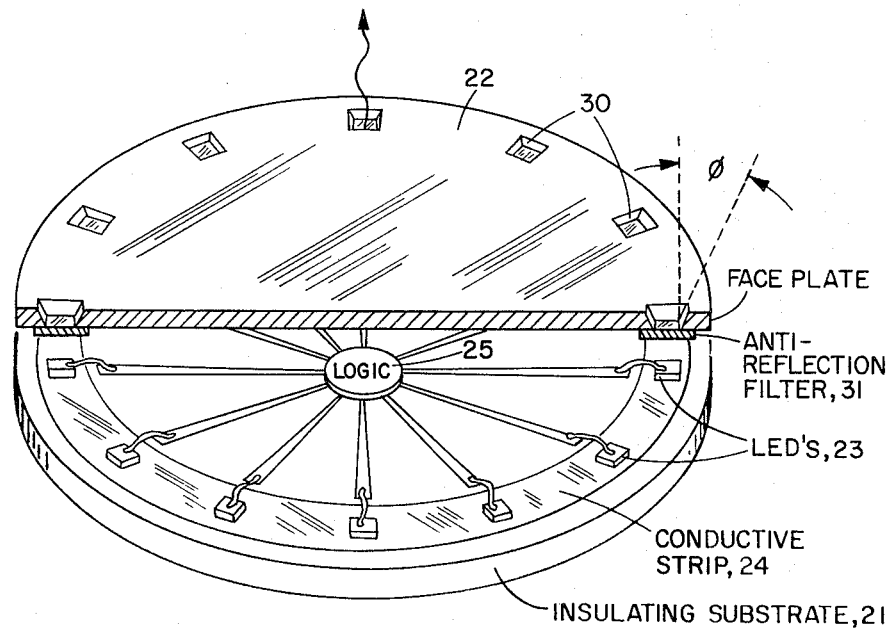
FIG. 14 is a partial cutaway drawing showing the construction of a light emitting diode display for a timepiece indicating a two layer configuration in which the top or cover layer includes a face plate having apertures therethrough and a narrow band-pass filter within each aperture in the face plate.
Figure 15:
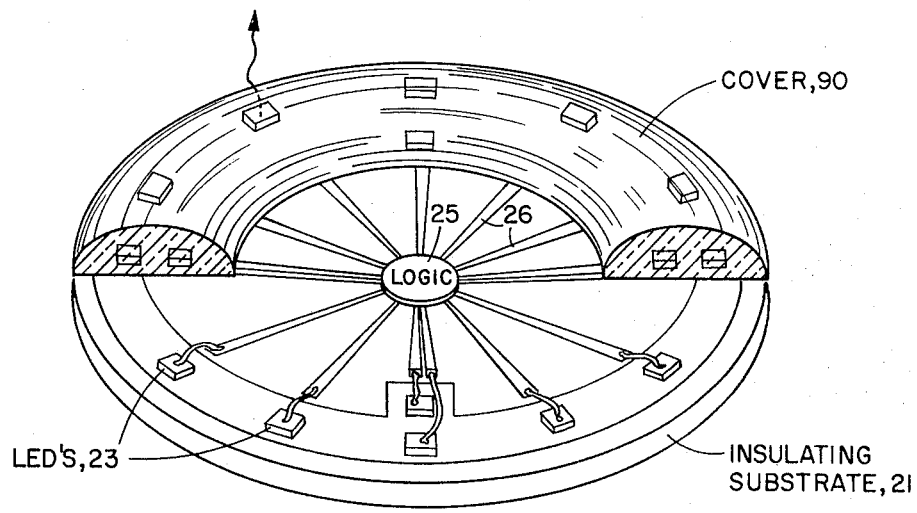
FIG. 15 shows a hybrid configuration for a light emitting diode display utilized in timepieces in which the narrow band-pass filter is in the form of a hemi-toroidal cover.

Referring now to FIG. 14, the same structure as that shown in FIG. 1 is shown with the exception that no solar cells, photodetectors or power control circuitry is shown. This configuration can be utilized in applications in which power consumption is not a problem but in which contrast in the display must be enhanced by the apertures 30 and the narrow band-pass filter 31. These applications include automobile clocks, the clocks powered by conventional "house-power." In these applications the preferred embodiment has the aforementioned preferentially etchable crystalline cover. Accordingly, in FIG. 15, the same structure as that shown in FIG. 10 is shown absent the photocells, photodetector and power control circuit. In this case, however, the logic circuit 25 may be located on the top surface of the substrate 21 with the metallization 26 also running along the top surface.

Figure 16:
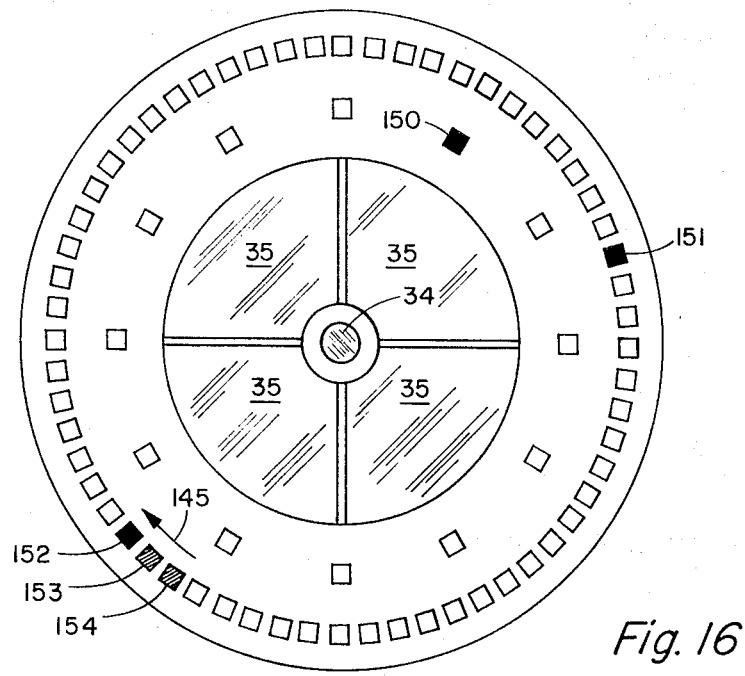
FIGS. 16 and 17 are top views of the subject display showing 72 and 84 diode arrays respectively for telling time by the second, minute, hour and in the case of FIG. 17, the half hour.
Figure 17:
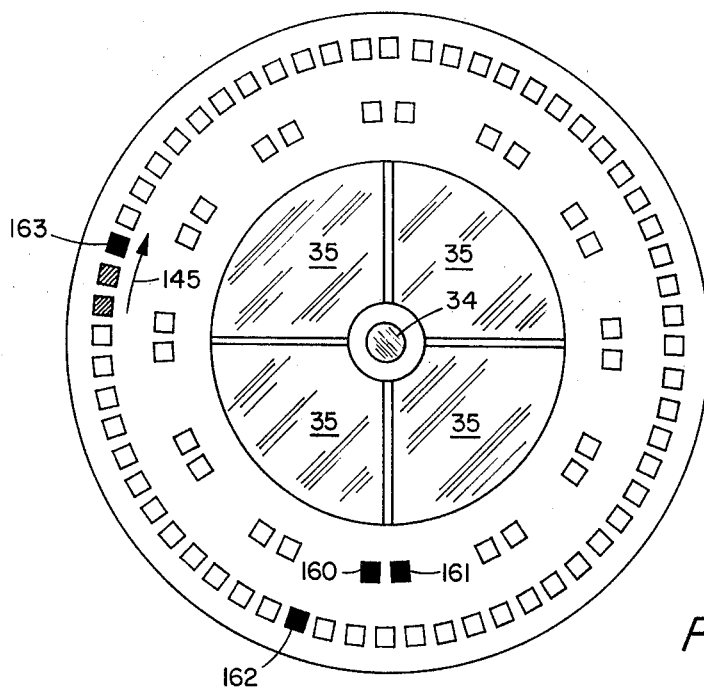

Referring now to FIGS. 16 and 17, top views of the completed timepiece display are shown, As mentioned previously, in order to represent the hour, minute and second a maximum of three diodes need be lit at one time. The time is indicated first by the inner ring of diodes shown in FIG. 16 indicating the hour. The outer ring of diodes indicates minutes and seconds. The minute diode is activated substantially continuously for 1 minute. During this time consecutive diodes are lit once each second in a clockwise direction, as shown by arrow 145. As can be seen from FIG. 16, the time indicated by diodes 150, 151 and 152 is 1:12 and 38 seconds. The two lightly shaded diodes 153 and 154 indicate those lit in the preceding 2 seconds.

For convenience and to eliminate any ambiguity in the reading out of the time from the display, half hour intervals are indicated as shown by the 24 diode inner ring of FIG. 17. The time represented by diodes 160–163 is 6:33 and 48 seconds. Diode 160 is lit to indicate that more than a half hour has elapsed. Prior to the half hour, only diode 161 is lit. This results in a display of the time of day with a maximum of four diodes.

Also shown in FIGS. 16 and 17 is the placement of four solar cells 35 and the photodetector 34. Additionally, it will be obvious that selective diodes may be made over-sized or a different color so as to facilitate the time read-out. Indeed the time readout may also be facilitated by appropriate markings on the display cover plate. A logic circuit for driving the displays shown in FIGS. 16 and 17 is now briefly described.

Referring now to FIG. 18, one possible logic 25 for driving the subject display is shown. The system operates from a crystal oscillator 240 tuned to $2^{16}$ Hz or 65,536 Hz. The output of the oscillator is a square wave having this frequency which drives a countdown circuit 241. This count-down circuit consists of a series of series-connected flip-flops or "divide-by-two" circuits. The output of the count-down circuit 241 is a 1 Hz square wave. The 1 Hz square wave drives three counters connected in series. The first is the "seconds" counter 242. For each incoming pulse there is an output in binary form indicating the number of the pulse from "0 to 59." The 60th pulse from the countdown circuit 241 returns counters 242 to "0" and is transmitted to "minutes" counter 243. The output of counter 243 is binary in form and indicates minutes from "0" to "59." When the 60th minute occurs, counter 243 is reset and simultaneously transmits a pulse to the "hours" counter 244. The output of counter 244 is also binary in form indicating one of 12 hours. In one embodiment counters 242 and 243 are 6 flip-flop counters with counter 244 containing only 4 flip-flops because only 12 diodes need be activated. Counters 242, 243 and 244, thus countdown the 1 Hz signal to provide signals representing minutes and hours. The outputs of counters 242–244 are decoded by decoders 246–248. Decoders 246 and 247 take the binary information from their respective counters and produce 60 individual signals on 60 individual output lines 249 in timed sequence such that only one of the output lines 249 contains a signal 256 at any one time. The signals appearing in these output lines indicate respectively seconds and minutes. Decoder 248's output is 12 individual signals on 12 different lines, likewise representing hours in timed sequence. The output lines from the decoders are coupled to drivers 250–252. The drivers have 60, 60 and 12 output lines 253 respectively. The presence of a signal on an output line 253 from a decoder causes the power delivered from the power control circuit 40 of FIG. 2 to be switched to a corresponding output line of the driver and thence to a corresponding light emitting element 255 connected as shown.

In order to utilize the time display as described above, one output from two or more drivers is connected to a single light emitting element. Then as shown in FIG. 18, the element 255 is "tied" to the "seconds" and the "minutes" drivers. Likewise it will be obvious that a further half hour counter-decoder-driver circuit could be provided having an output coupled in parallel with the output to driver 252 to a second set of light emitting elements. Counters 242–244, decoders 246–248 and drivers 250–252 are conventional.

Figure 19:
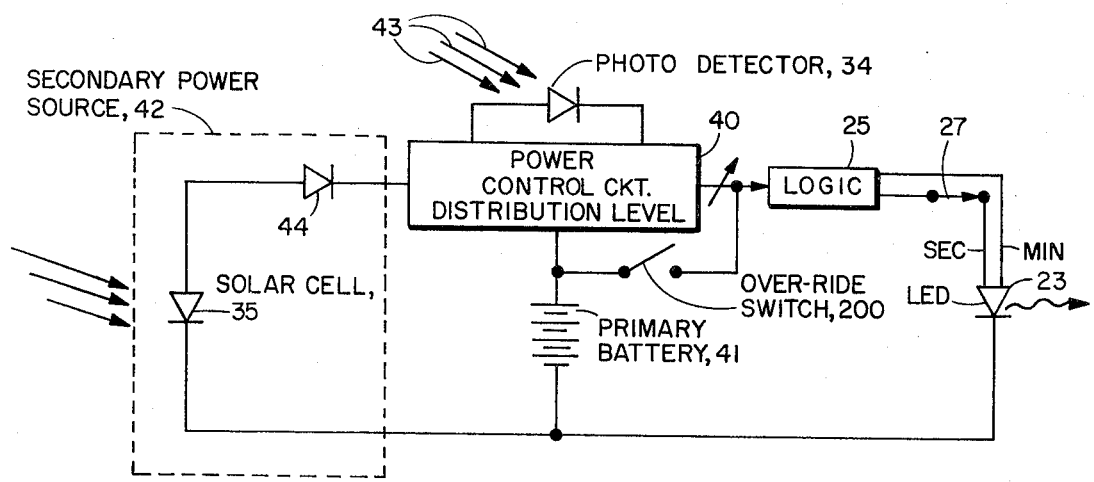
FIG. 19 is a block diagram showing a circuit which permits the display to be turned off under complete darkness conditions, also showing an over-ride switch.

If it is desired, a further power saving feature with the subject configuration involves a partial intermittent readout to even further extend battery life. In this case, the photodector 37 and the power control circuit 40 function as shown in FIG. 19 to turn off the light emitting diode display below a given ambient lighting condition. This condition is close to complete darkness which occurs under sleeping conditions at night or when the watch is worn under an opaque garment such as the sleeve of a coat. Under dark conditions, the electronic circuitry which produces signals indicating time is not interrupted. Only the power to the light emitting diodes is interrupted by shutting down the driver section or logic 25. However, a manually actuated switch is provided to over-ride the display shutdown if the user desires to read out the watch under these complete darkness conditions. This switch may take the form of a mercury switch which is positioned so as to turn on the display when the watch is in the viewing position. This over-ride switch is shown as switch 200 in FIG. 19. It will be appreciated that since the power control circuit 40 can vary the power delivered to the light emitting diode display, it can also interrupt the power completely. This is accomplished in the driver sections 250, 251 and 252 as shown in FIG. 18 by merely interrupting the power to the drivers.

In summary, there is disclosed both structural and electronic means for both increasing the contrast in an electro-optical display while at the same time decreasing the power necessary to drive the display when the ambient lighting condition is decreased or reduced. The electrical control portion of the subject invention can be utilized independent of the structural contrast enhancing portions of the invention or in combination therewith. Likewise, the sturctural components can be utilized to advantage independently of the electrical control portions. Additionally, the power control portion of the invention may be utilized independently of the secondary power source purely as a contrast control circuit or may be used in combination with the solar cell configuration both in a contrast control unit configuration and in a power boosting and battery charging configuration. Finally, a method has been described in which the light emitting diodes, the solar cells and the ambient light detector are fabricated in a single monolithic structure.

What is claimed is:

1. An electro-optical display for an electronic horologic instrument having a light emitting diode readout and a primary self-contained portable source of electric power therewithin comprising in combination:
    ambient light sensing means for detecting the amount of light falling on the exposed surface of said display and for generating an electric signal corresponding to the intensity of said light;
    power regulating means operative in response to said electric signal for varying the power available for energizing said light emitting diodes, the power varying function being such that a predetermined contrast is maintained between the surface brightness of any excited light emitting diode and the surface brightness of that portion of said exposed surface immediately adjacent said excited diode;
    a secondary power source, said power regulating means distributing the additional power available from said secondary power source during high ambient lighting conditions to portions of said horologic instrument in need of said additional power whereby the display configuration, said power regulating means, and said secondary power source contribute significantly to power conservation such that a prolonged substantially continuous readout of said instrument is possible over an extensive time period;
    a support member, said light emitting diodes being mounted on said support member and further including an opaque covering member positioned over said support member,
    said covering member having apertures therethrough corresponding in location to the locations of said light emitting diodes, to redirect and intensify the output of said light emitting diodes over a given viewing angle, each of said apertures having inclined sidewalls, configured so as to flare outwardly thereby reflecting light from said light emitting diodes at a viewing angle increased from that available by the use of non-inclined sidewalls having the same minimum aperture as said inclined sidewalled aperture.

2. The display as recited in claim 1 and further including narrow band-pass filtering means of said horologic instrument between said light emitting diodes and the user of said instrument for increasing the contrast between said light emitting diodes and the face of said instrument immediately surrounding said diodes herein said filtering means is in the form of a hemi-toroidal cover and is of a material absorbent to all light except that generated by said light emitting diodes, said material being of the same color as the light generated by said light emitting diodes and further including a circular substrate wherein said light emitting diodes are arranged along the periphery of said substrate, a central portion of said substrate being left free of both diodes and filtering means.

3. An electro-optical display for an electronic horologic instrument having a primary self-contained portable source of electric power therewithin comprising in combination:
    a light emitting diode readout wherein said light emitting diodes are arranged in concentric circles with diodes in one of said circles representing minutes and seconds, the diodes in another of said circles representing hours such that the time of day is read out from a maximum of three light emitting diodes, thus conserving on the number of diodes necessary to represent the time of day and thus the power consumption of the horologic instrument;
    ambient light sensing means for detecting the amount of light falling on the exposed surface of said display and for generating an electric signal corresponding to the intensity of said light;
    power regulating means operative in response to said electric signal for varying the power available for energizing said light emitting diodes, the power varying function being such that a predetermined contrast is maintained between the surface brightness of any excited light emitting diode and the surface brightness of that portion of said exposed surface immediately adjacent said excited diode;
    and a secondary power source, said power regulating means distributing the additional power available from said secondary power source during high ambient lighting conditions to portions of said horologic instrument in need of said additional power whereby the display configuration, said power regulating means, and said secondary power source contribute significantly to power conservation such that a prolonged substantially continuous readout of said instrument is possible over an extensive time period.

4. The display as recited in claim 1 wherein said covering member is made from [100] crystallographically oriented silicon and wherein said apertures having inclined sidewalls are formed by masking said covering member and etching all exposed areas with a potassium hydroxide etching solution.

5. The display as recited in claim 4 wherein the apertures in said mask are square and the apertures in the covering member thus formed are in the form of truncated pyramids with the smaller portion adjacent to the top of said light emitting diodes.

6. The display as recited in claim 1 wherein said light emitting diodes have significant emissions in directions non-perpendicular to the plane of said covering member and wherein said diodes are positioned within said apertures when said covering member is in place such that emissions non-perpendicular to the plane of said covering member are redirected towards the user of said horologic instrument thereby decreasing the amount of power necessary in driving said last mentioned light emitting diodes to obtain said predetermined contrast.

7. The display as recited in claim 1 wherein said secondary power source includes solar cells mounted on top of said covering member and wherein said ambient light sensing means is also located on top of said covering member, whereby the output of said ambient light sensing means can be correlated to the output of said solar cells in order to distribute the power from said solar cells properly between said primary power source and said light emitting diodes.

8. The display as recited in claim 7 wherein said solar cells and said ambient light sensing means are embedded in said covering member and insulated one from another.

9. The display as recited in claim 8 wherein said solar cells and said light sensing means are dielectrically isolated one from another in said covering member, said solar cells, said light sensing means and said covering member being formed monolithically.

10. The display as recited in claim 9 wherein said covering member is silicon.

11. The display as recited in claim 7 wherein all electrical components embedded within said covering member include metallization strips, said metallization strips being insulated from each other and running from respective electrical elements to the periphery of said covering member, whereby said metallization strips may be contacted at said periphery by conducting strips within an overlying portion of an outer casing for said horologic instrument thereby to connect electrical components on said covering member with components located underneath said covering member either underneath or on top of said support member.

12. The display as recited in claim 2 wherein said secondary power source includes solar cells mounted on said substrate at said central portion and wherein said ambient light sensing means is also located at said central portion.

13. The display as recited in claim 3 wherein additional light emitting diodes in said hour indicating circle also indicates half hours.

14. The display as recited in claim 3 and further including an additional circle of light emitting diodes indicating the half hour.

15. The display as recited in claim 3 and further including means for inactivating the diodes representing seconds by the user of the instrument thereby preventing user fatigue or mesmerization in addition to decreasing power consumption.

16. Apparatus for improving the contrast between light emitting diodes having light emissions in more than one direction, mounted on a substrate in a horologic display and portions of said display surrounding said diodes comprising:
a cover plate for said display, said cover plate having apertures therethrough over each light emitting diode, each of said apertures having inclined sidewalls tapered outwardly, said plate positioned such that each diode extends into a corresponding aperture a distance sufficient to provide that any exposed portion of the junction of each diode lies wholly within each aperture, said diodes being provided with a reflective backing plate such that any light generated by said diodes is redirected towards the user of said horologic display within a predetermined viewing angle.

17. The apparatus as recited in claim 16 wherein said cover plate is made from [100] crystallographically oriented silicon which has been selectively etched by potassium hydroxide to form said apertures.

18. Apparatus for improving the contrast between light emitting diodes mounted so as to convey time in a horologic display and portions of said display surrounding said diodes comprising in combination:
a cover plate for said display, said cover plate having apertures therethrough over each light emitting diode in the display, said apertures having outwardly inclined sidewalls to permit a maximum viewing angle for said display, and
narrow band-pass filtering means located at the surface of said display between said light emitting diodes and the user of said display, said means acting so as to absorb light impinging on said display from outside sources, and so as to pass light generated by said diodes whereby said contrast is improved by increasing the amount of diode generated light reaching said user while decreasing light reflected from said display.

19. The apparatus as recited in claim 18 wherein said filtering means is material which absorbs all light except that generated by said diodes, said material being of the same color as the light from said diodes.

20. The apparatus as recited in claim 18 wherein said filtering means is material which circularly polarizes light therethrough such that while the light generated by said diode passes only once through said material and is thereby circularly polarized, the light impinging on said display from the outside thereof acquires a circular polarization when it first passes through said material, is phase shifted as it is reflected from inside said display and is attenuated as it passes back through said material as it passes therethrough a second time.

21. In combination:
a substrate,
light emitting diodes mounted on said substrate arranged to indicate the time of day and electrically isolated one from another,
a logic circuit mounted on said substrate, said logic circuit generating signals in a timed sequence for activating selected light emitting diodes to represent the time of day,
metallization connecting said light emitting diodes to said logic circuit so as to energize said light emitting diodes in a sequence determined by said logic circuit,
a covering member over top said substrate, said covering member having inclined sidewall apertures flaring outwardly from said substrate at each of said light emitting diodes,
narrow band-pass filtering means at said covering member in position to pass light generated by said diodes and to absorb light impinging on the exposed surface of said cover adjacent said diodes,
solar cells mounted on said cover, and
ambient light detecting means mounted on said cover, whereby said combination permits the formation of a horologic instrument in which light impinging on instrument aids in the powering of said instrument and whereby said filtering means in combination with said inclined sidewall apertures increases the contrast between light generated by said diodes and light reflected from the exposed portions of said horologic instrument such that a portable battery powered timepiece is made feasible.

22. The combination as recited in claim 21 wherein said substrate is selected from the group of materials consisting of:
semiconductors,
plastics,
ceramics and
glasses.

23. The combination as recited in claim 22 wherein said covering member is made from an anisotropically etchable crystalline material, said inclined sidewalled apertures being formed by etching said crystalline material with an anisotropic etchant.

24. The combination as recited in claim 21 and further including metallization on said covering member running from said diodes, said solar cells and said ambient light detecting means to the periphery thereof, and a housing member overlying said periphery, said housing member including means for contacting various portions of said metallization at said periphery and for connecting said portions to points interior to said housing member.

25. The combination as recited in claim 21 wherein said light emitting diodes and said logic circuit are formed in said substrate and said solar cells and said ambient light detecting means are formed in said covering member.

26. The combination as recited in claim 21 wherein said solar cells and said ambient light detecting means are embedded in said covering member and dielectrically isolated one from another.

27. The combination as recited in claim 50 wherein embedding includes epitaxial deposition and diffusion techniques.

* * * * *